350-172 SR

6/15/82 XR 4,335,421

United States Patent [19]

Modia et al.

[11] 4,335,421

[45] Jun. 15, 1982

[54] LIGHT FIXTURE, LIGHT APERTURE AND METHOD OF UNIFORMLY ILLUMINATING AN OPTICALLY DIFFUSIVE VIEWING AREA

[76] Inventors: Joseph W. Modia; James McCarthy, III, both of 1508 Edenton Ct., Fort Wayne, Ind. 46804

[21] Appl. No.: 130,743

[22] Filed: Mar. 17, 1980

[51] Int. Cl.3 ........................ G09F 13/10; G02B 5/08; G02B 27/14; F21L 3/00; F21V 7/12

[52] U.S. Cl. .................................... 362/223; 350/172; 350/278; 350/288; 350/291; 350/299; 362/97; 362/125; 362/260; 362/290; 362/297; 362/298; 362/300; 362/301; 362/302; 362/307; 362/342; 362/343; 362/346; 40/361; 40/367

[58] Field of Search ................. 362/97, 125, 223, 260, 362/290, 297, 298, 300, 301, 302, 307, 342, 343, 346; 40/361, 367; 350/288, 278, 291, 299, 172

[56] References Cited

U.S. PATENT DOCUMENTS

| | | | |
|---|---|---|---|
| 587,443 | 8/1897 | König | 350/172 |
| 693,088 | 2/1902 | Wadsworth | 362/342 |
| 1,199,882 | 10/1916 | Frey | 350/291 |
| 1,231,710 | 7/1917 | Comstock | 362/342 |
| 1,253,138 | 1/1918 | Brewster | 350/172 |
| 1,442,463 | 1/1920 | Bowman | 362/342 |
| 1,752,477 | 4/1930 | Brewster | 350/172 |
| 2,387,745 | 10/1945 | Colbert et al. | 350/288 |
| 3,019,331 | 1/1962 | Geist | 362/97 |
| 3,184,585 | 5/1965 | Rouy | 362/97 |
| 3,503,681 | 3/1970 | Jons et al. | 362/342 |
| 3,668,406 | 6/1972 | Reid et al. | 350/172 |
| 3,694,945 | 10/1972 | Detiker | 350/172 |
| 3,811,212 | 5/1974 | Wright | 362/97 |
| 4,040,727 | 8/1977 | Ketchpel | 350/288 |
| 4,071,883 | 1/1978 | Dennis | 362/97 |
| 4,184,194 | 1/1980 | Shofu | 362/260 |
| 4,242,725 | 12/1980 | Douma et al. | 362/223 |
| 4,254,456 | 3/1981 | Grimdle et al. | 362/300 |

FOREIGN PATENT DOCUMENTS

| | | | |
|---|---|---|---|
| 1157567 | 11/1963 | Fed. Rep. of Germany | 362/223 |
| 2404165 | 4/1979 | France | 362/260 |
| 45-36540 | 11/1970 | Japan | 350/288 |
| 55-105205 | 8/1980 | Japan | 350/288 |
| 619360 | 3/1949 | United Kingdom | 350/278 |
| 737765 | 9/1955 | United Kingdom | 350/278 |

*Primary Examiner*—Teddy S. Gron
*Attorney, Agent, or Firm*—David A. Lundy

[57] ABSTRACT

A light fixture having an optically diffusive viewing element having a viewing area across which apparent uniform brightness is achieved from a conventional light source and reflector by utilization of a light aperture. The light aperture comprises a tralucent substrate to which a plurality of reflective surfaces are affixed so as to partially redirect light incident thereon back to the reflector. Apparent uniform brightness of the light fixture viewing area is derived by a unique method of dividing the light from the light source into varying portions of direct and indirect illumination through the light aperture as well as direct illumination from the light source and indirect reflection from the reflector to the viewing area.

22 Claims, 5 Drawing Figures

Fig. 1
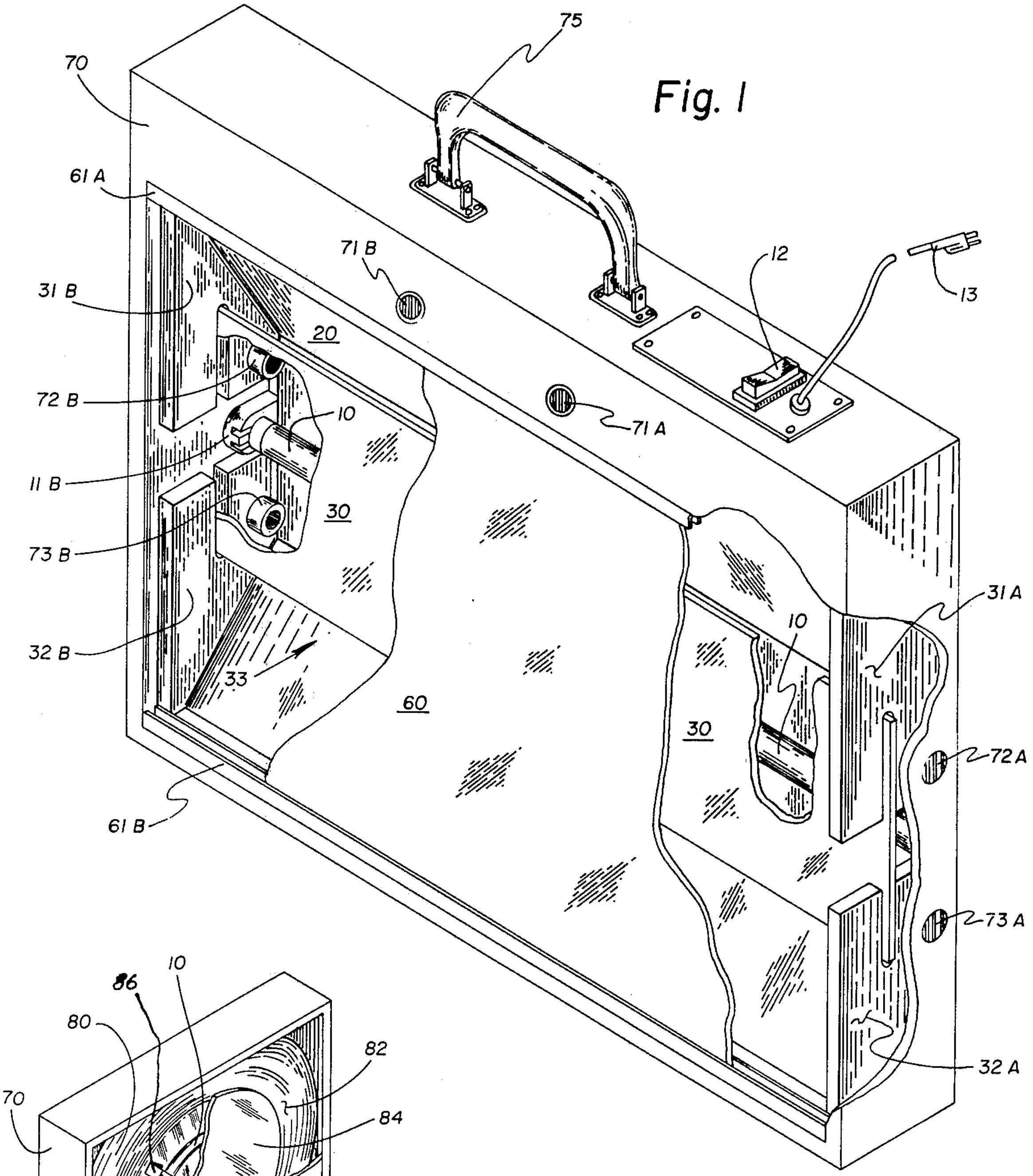
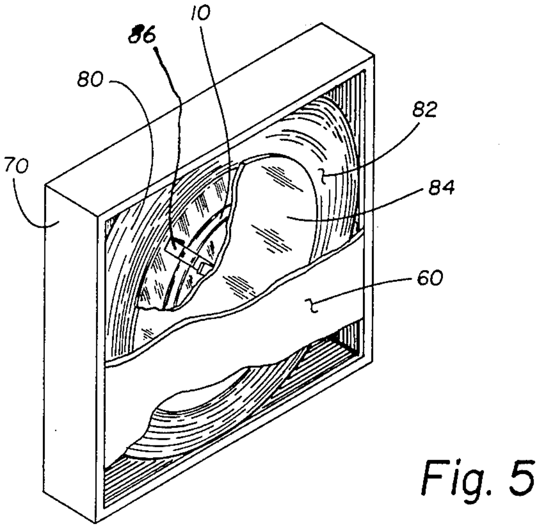
Fig. 5

LIGHT FIXTURE, LIGHT APERTURE AND METHOD OF UNIFORMLY ILLUMINATING AN OPTICALLY DIFFUSIVE VIEWING AREA

BACKGROUND OF THE INVENTION

This invention relates to a light fixture, a light aperture and a method of dividing the light from a conventional light source and reflector into various portions of incident and reflected light resulting in generally uniform illumination of a viewing area of an optically diffusive element at a brightness level higher, and in a space smaller, than expected. Applications include light fixtures directly viewed by the human eye for exacting and cursory inspections such as x-ray viewers, illuminated tracing tables and transparency displays. Other utilizations could include lighting equipment used in the reproduction or transfer of photographic material such as plate makers, exposure equipment and photocopy machines. Additional utilization could be made of this light fixture in any applications requiring uniform lighting at high brightness levels.

At present, one prescribed method of approximating uniform light intensity across the viewing area of an optically diffusive element is by positioning the light source at as great a distance as practicable therefrom. In this manner, by removing the light source to a point at which the ratio of shortest to longest distances the light must traverse approaches one to one (accounting for the albedo of the reflector structure), the viewing area appears at all points equally illuminated. This method has the disadvantage of increasing physical dimensions of the light fixture while simultaneously decreasing the overall illumination. Additional light sources are then required to increase brightness to acceptable levels. Usually, the more light sources used, the more heat is generated.

Another prescribed method of approximating uniform light intensity across the viewing area of an optically diffusive element involves using special light sources. These are generally expensive, not readily available and not preferred.

SUMMARY OF THE INVENTION

It is a primary object of the invention to provide an improved light fixture, a light aperture and a method of uniformly illuminating an optically diffusive element.

It is also an object of the invention to provide an improved light fixture, a light aperture and a method of uniformly illuminating the viewing area of an optically diffusive element for use in x-ray viewers, illuminated tracing tables and transparency displays.

It is also an object of the invention to provide an improved light fixture, a light aperture and a method of uniformly illuminating the viewing area of an optically diffusive element for use in the reproduction or transfer of photographic material as in plate makers, exposure equipment and photocopy machines.

It is also an object of the invention to provide an improved light fixture, a light aperture and a method of uniformly illuminating the viewing area of an optically diffusive element for use as a portable unit.

It is also an object of the invention to provide an improved light fixture, a light aperture and a method of uniformly illuminating the viewing area of an optically diffusive element capable of providing high levels of illumination from a single light source.

It is also an object of the invention to provide an improved light fixture, a light aperture and a method of uniformly illuminating the viewing area of an optically diffusive element with conventional fluorescent tubes as a light source, in contrast to specialized light sources.

It is also an object of the invention to provide an improved light fixture, a light aperture and a method of uniformly illuminating the viewing area of an optically diffusive element capable of partially shielding the viewing area from the heat generated by the light source.

It is still another object of the invention to provide an improved light fixture, a light aperture and a method of uniformly illuminating the viewing area of an optically diffusive element allowing the overall physical dimensions of the unit to be maintained at an absolute minimum.

It is still another object of the invention to provide an improved light fixture, a light aperture and a method of uniformly illuminating the viewing area of an optically diffusive element fulfilling all of the objects mentioned hereinabove.

In the broader aspects of the invention there is provided a light fixture, a light aperture and a method of uniformly illuminating the viewing area of an optically diffusive element. The light fixture includes an optically diffusive element having a surface with a viewing area. A light source, for example a conventional fluorescent tube, in conjunction with a reflector which redirects light incident thereon at positions remote from the non-reflected light, illuminates the viewing area. The light aperture includes a tralucent substrate having portions thereof which reflect light incident thereon to the reflector as well as portions transmitting light therethrough onto the viewing area, is mounted between the light source and the optically diffusive element. The method includes dividing the light from the light source into varying portions of direct and indirect illumination through the light aperture as well as direct illumination from the light source and indirect reflection from the reflector.

BRIEF DESCRIPTION OF THE DRAWING

The above mentioned and other features and objects of this invention and the manner of attaining them will become more apparent and the invention itself will be best understood by reference to the following description of the invention taken in conjunction with the accompanying drawings wherein:

FIG. 1 is a perspective view of the light fixture of the invention wherein the interrelation of the light source, reflector and light aperture are shown by breaking away a portion of the viewing panel and light aperture;

FIG. 5 is a fragmentary and broken away perspective view of a modified light fixture made in accordance with the invention.

DETAILED DESCRIPTION OF A SPECIFIC EMBODIMENT

Figure 2:
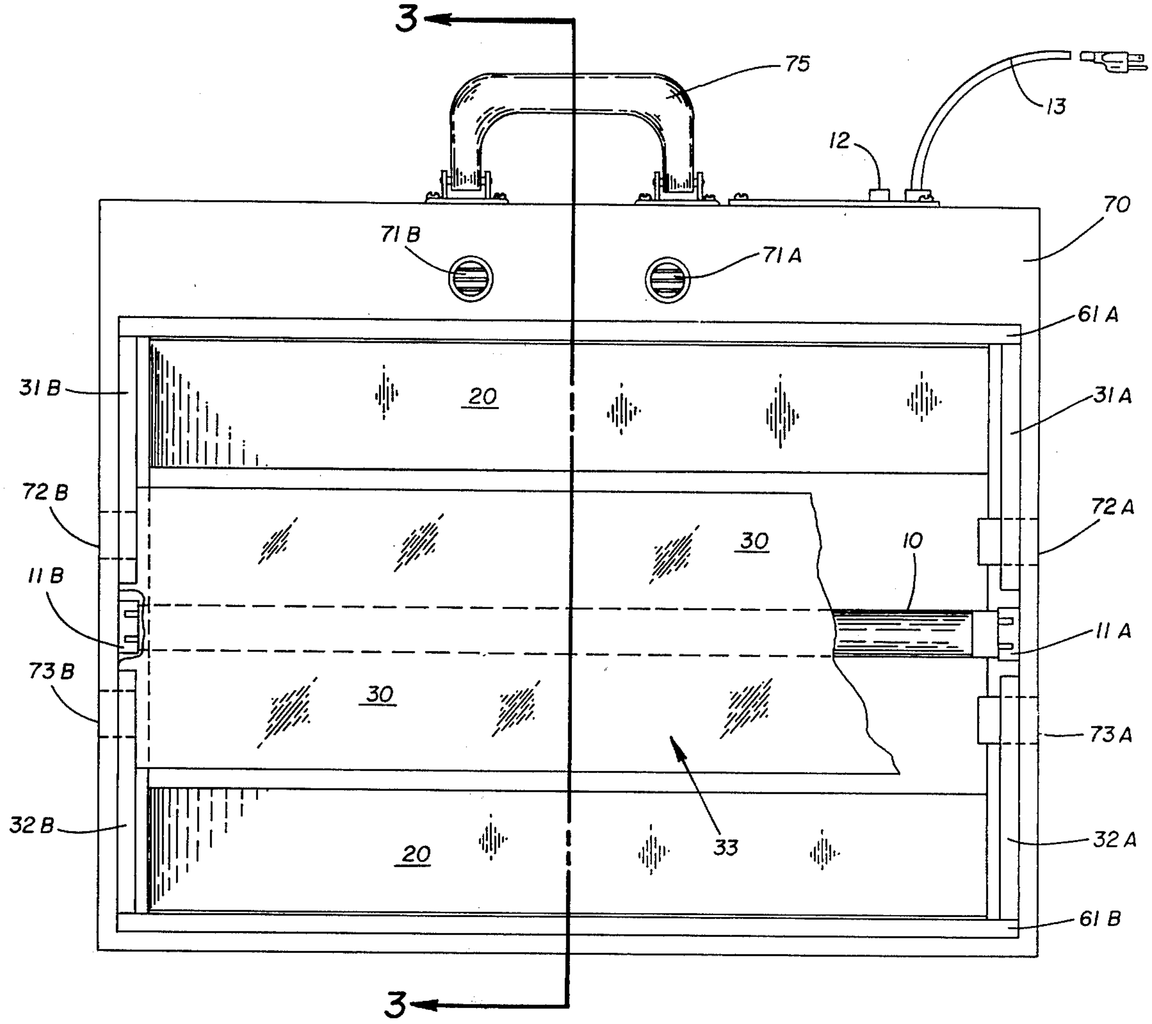
FIG. 2 is a front view of the light fixture of FIG. 1 with the viewing panel removed.

In FIG. 1, the light fixture of the invention is illustrated. The light source 10 of the fixture 8 operates on standard 115 volt 60 HZ alternating current supplied through line cord 13 and controlled by switch 12. Wiring to sockets 11A and 11B from line cord 13 and switch 12 provide power to operate the light source 10. In the specific embodiment illustrated, the light source 10 comprises a standard elongated fluorescent tube. Sockets 11A and 11B also serve as a mounting device for light source 10.

Light emanating from light source 10 is uniformly emitted from the centerline of the tube in all directions. A reflector 20 redirects the light incident on its surfaces back toward the planes of the light source 10 and optically diffusive viewing panel 60. In a specific embodiment, the reflector 20 comprises a sheet of aluminum metal with angular bends in its structure along lines parallel to the longitudinal axis of the light source 10 with a high gloss white paint applied to the surfaces having light incident thereon in order to increase the relative albedo of the reflector 20. The reflector 20 is physically mounted to the base of light fixture case 70 which in the configuration depicted comprises a rectangular wooden box with a carring handle 75 thereby rendering the device readily transportable.

An opening on one side of the light fixture case 70 opposite the reflector 20 received an optically diffusive viewing panel 60. The optically diffusive panel 60 is mounted parallel to the plane of the reflector structure 20 opposite the light source 10. Panel 60 is attached to the light fixture case 70 by means of upper and lower retaining channels 61A and 61B respectively. Ventilation for the light fixture is provided by ventilation ports 71A and 71B mounted nearest the upper retaining channel 61A and by ventilation ports 72A, 73A, 72B and 73B on the sides of light fixture case 70 as depicted in FIGS. 1 and 2.

Figure 3:
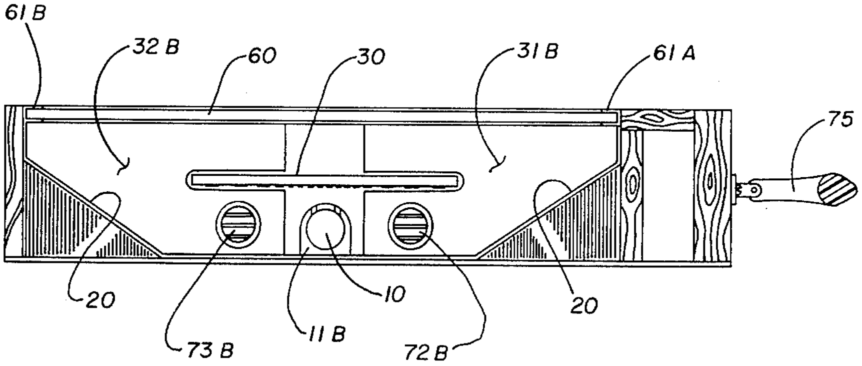
FIG. 3 is a cross sectional view taken substantially along section area 3—3 of FIG. 2 detailing the relative positions of the light source, light aperture, reflector and optically diffusive element.

Light emanating from light source 10 and reflected by the reflector 20 towards the optically diffusive panel 60 varies in intensity across the panel. The different distances of the portions of this panel from the light source 10, coupled with partial absorption at the surface of the reflector 20, cause the light intensity to fall off at all points along said plane from a maximum above the center line of the light source 10 to a minimum adjacent to the area of the upper and lower retaining channels 61A and 61B. As shown in FIG. 3, light from light source 10 is intercepted by light aperture 33 comprising a tralucent substrate 30 and reflective surfaces 40A, 40B, 41A, 41B, 42A, 42B, 43A, 43B, 44A, 44B, 45A, 45B, 46A, 46B, 47A, and 47B. The light aperture 33 is mounted spaced apart and parallel to light source 10 and the optically diffusive panel 60 by mounting supports 31A, 31B, 32A, and 32B. In specific embodiments, the tralucent substrate 30 may be transparent or translucent as is desired.

Figure 4:
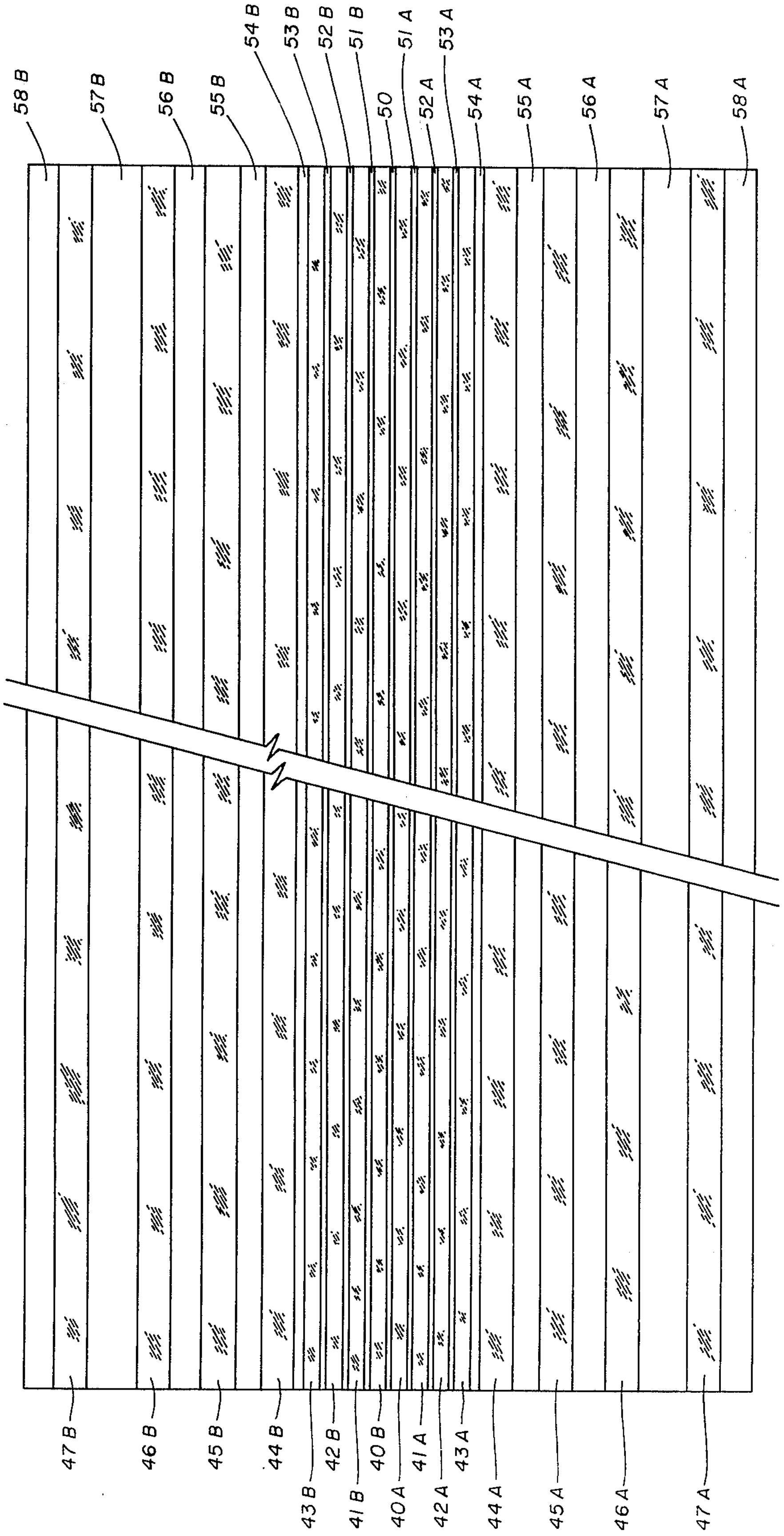
FIG. 4 is a detail plan view of the light aperture of the invention showing the tralucent substrate and reflective surfaces thereof.

The light aperture 33 is depicted in further detail in FIG. 4 as a tralucent substrate 30 upon which a series of spaced apart and parallel reflective surfaces 40A, 40B, 41A, 41B, 42A, 42B, 43A, 43B, 44A, 44B, 45A, 45B, 46A, 46B, 47A, and 47B are attached. Reflective surfaces 40A, 40B, 41A, 41B, 42A, 42B, 43A, 43B, 44A, 44B, 45A, 45B, 46A, 46B, 47A, and 47B are also parallel to light source 10 and may conveniently be formed of reflective tape or paint. These reflective surfaces redirect light incident on them back towards the reflector 20. Between these reflective surfaces are interstitial spaces 50, 51A, 51B, 52A, 52B, 53A, 53B, 54A, 54B, 55A, 55B, 56A, 56B, 57A, 57B, 58A, and 58B allowing light incident at these points to pass through the tralucent substrate 30 to the optically diffusive viewing panel 60.

In the specific embodiment illustrated, the widths of the reflective surfaces 40A, 40B, 41A, 41B, 42A, 42B, 43A, and 43B are the same as are interstitial spaces 50, 51A, 51B, 52A, 52B, 53A, and 53B in the area immediately corresponding to the width of the light source 10. The reflective surfaces 44A, 44B,45A, 45B, 46A, 46B, 47A, and 47B are of uniform greater width while the interstitial spaces 54A, 54B, 55A, 55B, 56A, 56B, 57A, 57B, 58A, and 58B are of a progressively increased width as the position of these surfaces approaches the edges of the tralucent substrate 30. In other embodiments, the widths of the reflective surfaces also may progressively increase together with either uniform width or progressively decreased interstitial spaces.

The effect of the light aperture 33 is to break the light from light source 10 into portions which are directly incident upon panel 60 and portions which are reflected back toward reflector 20. Additionally, reflected light from the reflector 20 is alternately allowed to pass through the tralucent substrate 30 or be reflected back to the reflector 20 thereby increasing its efficiency. The increasing width of interstitial spaces 54A, 54B, 55A, 55B, 56A, 56B, 57A, 57B, 58A, and 58B and widths of reflective surfaces 40A, 40B, 41A, 41B, 42A, 42B, 43A, 43B, 44A, 44B, 45A, 45B, 46A, 46B, 47A, and 47B respectively, allow increasingly greater amounts of reflected light through to the optically diffusive panel 60 or to be reflected back to reflector 20.

The overall effect on the light passing through the light aperture 33 is to reduce the intensity of such to the portions of the optically diffusive panel 60 corresponding to the physical dimensions and position of the light source 10. Correspondingly, reflected and indirect light of lesser intensity passes through the light aperture 33 with less restriction.

By the invention a viewing area can be uniformly illuminated with an intensity comparable with prior art devices without requiring the large physical deminsions of such prior art devices. In fact, the specific embodiment illustrated having a tralucent substrate 30 has a thickness dimension of $2\frac{3}{4}$ inches. Such allows the light fixture of the invention to be portable. All of this can be accomplished without the use of any specialized light source.

By ventilating the space of the case 70 between the tralucent substrate 30 and the reflector 20 much heat is dissipated. Also tralucent substrate 30 partially blocks the optically diffusive panel 60 from radiant heat. Thus, the light fixture of the invention operates at cooler temperatures than expected.

FIG. 5 illustrates an alternative application of the principles of the invention utilizing a circular light tube as light source 10. In a specific embodiment, a conventional circular fluorescent tube may be employed. In association therewith is shown a dish shaped reflector 80 having a conical reflective surface 82 which serves to redirect light incident thereupon to the optically diffusive panel 60.

Interposed between the light source 10 and the optically diffusive panel 60 is illustrated a tralucent substrate 84 having a plurality of reflective surfaces 40A, 40B, 41A, 41B, 42A, 42B, 43A, 43B, 44A, 44B, 45A, 45B, 46A, 46B, 47A, and 47B superimposed thereon, separated by interstitial spaces 50, 51A, 51B, 52A, 52B, 53A, 53B, 54A, 54B, 55A, 55B, 56A, 56B, 57A, 57B, 58A and 58B. Each of these surfaces and spaces are generally parallel to and dimensioned and spaced from light source 10 as shown in FIG. 4 thereby forming generally concentric and spaced-apart annuli (not shown). A plurality of brackets 86 (one shown) support the circular light tube and diffusive panel 60. By maintaining a constant width of the reflective surfaces and interstitial spaces in the area of the tralucent substrate 84 directly corresponding to the light source 10 and increasing the width of reflective surfaces to a uniform greater width while progressively increasing the width of interstitial spaces in all other areas, as the distance of each space from light source 10 increases, the principles of the invention are further applicable and alternatively utilized.

It is also apparent that light sources of any geometry and physical dimensions may be similarly employed when utilized with an associated reflector and tralucent substrate having spaced apart, reflective surfaces in a functionally equivalent configuration.

In addition to the apparatus disclosed above it will be evident to those skilled in the art that the light fixture might also be employed in any application requiring apparent uniform illumination of an optically diffusive panel, such as in x-ray viewers, illuminated tracing tables, transparency displays, photographic plate makers, exposure equipment and photocopy machines, with minimum dimensions and using a single conventional light source.

While there have been described above the principles of this invention in connection with specific apparatus, it is to be clearly understood that this description is made only by way of example and not as a limitation to the scope of the invention.

What is claimed is:

1. A light fixture comprising an optically diffusive element having a surface including a viewing area, a light source spaced from said diffusive element, a reflector spaced from said light source, said light source being between said reflector and said diffusive element, said reflector redirecting light incident thereon to said viewing area of said diffusive element, a tralucent substrate mounted between said light source and said diffusive element, said substrate having portions thereof which reflect light incident thereon to said reflector, said substrate having other portions thereof which transmit light therethrough onto said viewing area of said diffusive element, the light from said light source being also directly incident on said viewing area of said diffusive element, the light on said viewing area from said reflector being generally between said light on said viewing area transmitted through said substrate and said light on said viewing area directly incident thereon whereby said viewing area is generally uniformly illuminated.

2. A light fixture according to claim 1 wherein the light source is a tubular light source.

3. A light fixture according to claim 1 wherein the light source is an elongated fluorescent tube.

4. A light fixture according to claim 1 wherein the light source is a circular fluorescent tube.

5. A method of uniformly illuminating a viewing area of an optically diffusive element by a light source comprising the steps of dividing the light from said light source into at least four portions, transmitting a first portion of light through a tralucent material and onto said viewing area, reflecting a second portion of light from said light source onto said tralucent material and transmitting said second portion of light through said tralucent material and onto said viewing area, reflecting a third portion of light from said light source directly onto said viewing area, permitting a fourth portion of light from said light source to shine directly on said viewing area, and arranging said second and third portions on said viewing area generally between said first and fourth portions.

6. A method according to claim 5 wherein said step of reflecting a second portion of light further comprises the step of reflecting a portion of light from a reflective material affixed to said tralucent material to a reflector.

7. A method according to claim 5 wherein said steps of reflecting second and third portions of light is carried out by a reflector, said reflector and said tralucent material being located on opposite sides of said light source.

8. A method according to claim 5 wherein said step of dividing further comprises the steps of restricting the light to be transmitted through an area of said tralucent material directly corresponding to the dimensions of said light source and allowing for less restrictive transmission in all other areas.

9. A method according to claim 5 wherein said step of dividing further comprises the step of masking a portion of said tralucent material.

10. A method according to claim 9 wherein said step of masking is carried out by opaque material affixed to portions of said tralucent material.

11. A method according to claim 5 wherein said reflecting steps are partially carried out by reflective material affixed to portions of said tralucent material.

12. A light fixture comprising an optically diffusive element having a surface including a viewing area, a reflector, a light source positioned between said reflector and said diffusive element, a tralucent substrate mounted between said light source and said diffusive element, and a plurality of reflective surfaces on said substrate facing said light source, the surface area concentration of said reflective surfaces generally decreasing away from said light source whereby said viewing area is uniformly illuminated.

13. A light aperture for use in generally uniformly illuminating a viewing area with a reflector and a light source mounted between the viewing area and the reflector, the aperture comprising: a tralucent substrate adapted to be mounted between the viewing area and the light source, a plurality of reflective surfaces on said substrate facing the light source, said reflective surfaces defining a plurality of regions on said substrate, a central one of said regions being near the light source having a relatively high surface area concentration of said reflective surfaces, and peripheral ones of said regions being on opposite sides of said central region having a relatively lower surface area concentration of said reflective surfaces.

14. The light aperture of claim 13 wherein said peripheral regions permit a greater degree of light incident thereon to pass through said substrate, and said central region permits a lesser degree of light incident thereon to pass through said substrate.

15. A light aperture for use in generally uniformly illuminating a viewing area of an optically diffusive element of a light fixture, the aperture comprising:

a sheet of tralucent material adapted to be mounted between the viewing area and a light source with one surface of said sheet facing said light source, said sheet having portions of said one surface which are reflective of light incident thereon, said sheet having other portions of said one surface which allow light incident thereon to pass through said sheet, the concentration of said reflective portions decreasing away from said light source.

16. The light aperture of claim 15 wherein said reflective portions are spaced apart elongated strip portions.

17. The light aperture according to claim 13 wherein the tralucent substrate is diffused glass.

18. The light aperture according to claim 16 wherein the reflective strips are strip portions of silver film tape adhesively secured to said one sheet surface.

19. The light aperture of claim 16 wherein said strip portions are parallel to said light source and to each other.

20. The light aperture of claim 16 wherein said strip portions form a concentric strip pattern arranged on all sides of said light source.

21. The light aperture of claim 15 wherein said reflective portions are spaced apart elongated strip portions, the spacing between which progressively increases the further said strip portions are away from said light source.

22. The light aperture of claim 15 wherein said reflective portions are spaced apart elongated strip portions, the width of said reflective portions being progressively smaller the further away from said light source said reflective portions are located.

* * * * *